United States Patent [19]

Carlberg

[11] 3,877,920
[45] Apr. 15, 1975

[54] METHOD OF RECLAIMING WASTES AND PRODUCTS THEREFROM

[76] Inventor: George Carlberg, Rt. 1, Box 24, Manns Choice, Pa. 15550

[22] Filed: Jan. 31, 1973

[21] Appl. No.: 328,359

[52] U.S. Cl. .............................. 71/21; 71/28; 71/58
[51] Int. Cl. ............................................... C05f 3/00
[58] Field of Search ....... 119/1; 424/76, 131; 71/21, 71/64 G, 28, 58, 61; 99/2 R, 4, 3; 252/184, 194; 4/115

[56] References Cited

UNITED STATES PATENTS

| | | | |
|---|---|---|---|
| 1,424,829 | 8/1922 | Kleb | 71/21 X |
| 2,117,808 | 5/1938 | Jones | 71/64 A |
| 2,200,107 | 5/1940 | Weitz | 71/21 |
| 3,030,222 | 4/1962 | Eichenlaub | 264/80 X |
| 3,372,018 | 3/1968 | Stocker et al. | 71/64 A |
| 3,657,423 | 4/1972 | Yacowitz | 99/4 |
| 3,776,188 | 12/1973 | Komakine | 71/21 X |

FOREIGN PATENTS OR APPLICATIONS

| | | |
|---|---|---|
| 46-18566 | 5/1971 | Japan |
| 45-19605 | 7/1970 | Japan |

Primary Examiner—Charles N. Hart
Attorney, Agent, or Firm—Mason Fenwick & Lawrence

[57] ABSTRACT

Organic waste material such as animal manure, spent mushroom compost, composted municipal wastes, sewage plant solids, and agricultural processing wastes are reclaimed and reusable by homogeneously mixing one or more of the organic wastes with a fly ash binder in weight ratios between about 20:1 and about 1:9. The reclaimed wastes are deodorized and useful as fertilizers, as agents for reclaiming coal mine wastes, and as support material for plants.

10 Claims, No Drawings

METHOD OF RECLAIMING WASTES AND PRODUCTS THEREFROM

BACKGROUND OF THE INVENTION

1. Field of the Invention

This invention relates to the treatment of waste materials normally difficult to dispose of. More particularly, this invention contemplates the treatment of odoriferous waste products with fly ash. In this manner, organic wastes are deodorized to yield a commercially valuable fertilizer composition.

2. Description of the Prior Art

Organic wastes, e.g., animal manures, spent mushroom compost, municipal wastes, sewage plant solids, and agricultural processing wastes, have presented a serious disposal problem because they undergo aerobic and anaerobic decomposition to obnoxious and odoriferous products. Similarly, the disposal of fly ash from the combustion products of pulverized coal has similarly long been a problem. Since 1945, an estimated 300 million tons of fly ash have been produced in the United States by electric utilities and other operations which use the pulverized fuel burner. It is estimated that only about 3 percent of the available fly ash has been used. The disposal cost for the remainder has also been estimated to range from $0.25 to $2.00 per ton.

Various techniques have been suggested for utilizing fly ash commercially. One such application is in the area of concrete manufacture where the fly ash is added into the concrete and allegedly improves the properties of the hardened material. In U.S. Pat. No. 3,030,222 to Eichenlaub there is disclosed the use of fly ash-sewage sludge nodules which are sintered to form a light-weight aggregate. However, the sintered, clinkerlike product of Eichenlaub contains less than about 1% by weight of organic matter and is therefore virtually useless as a source of nitrogenous and organic nutrients for plants.

It should also be mentioned that different types of organic waste products have been treated by a variety of techniques, as shown, for example, in:

U.S. Pat. No. 1,895,159 which discloses burning of sewage sludge combined with a water absorptive material, e.g., ashes;

U.S. Pat. No. 2,200,107 which discloses molding and baking comminuted moistened manure;

U.S. Pat. Nos. 193,908, 2,094,513, and 3,372,018 which disclose the use of animal manure with earth as a plant-fertilizing container. None of the aforementioned patents discloses or suggests the present invention.

DESCRIPTION AND ADVANTAGES OF THE INVENTION

In brief, this invention contemplates the mixture of odorous organic wastes with fly ash to afford a deodorized composition suitable for use as a fertilizer, an agent for the reclamation of acidic coal mine wastes, as a soil conditioner for example in a mixture with grass or plant seed for application to roadway banks, and as a binder forming a support material for planting pots.

Although lime and limestone often have been used to deodorize organic wastes, these materials are much more expensive than fly ash used in the present invention and are less effective deodorizing agents than fly ash. The present process thus contemplates the use of low cost, readily available fly ash to decrease the obnoxious properties of the organic wastes and to yield a valuable product.

Organic wastes especially suitable for deodorization by the method of this invention include animal manures, spent mushroom compost, municipal waste, sewage plant solids, garbage and agricultural processing waste. Deodorized fertilizer compositions prepared by the practice of this invention include those based on animal manures, spent mushroom compost, municipal waste, and agricultural processing wastes. Materials appropriate for the preparation of planting pots and for the reclamation of coal mine wastes include homogeneous mixtures of fly ash with animal manures, spent mushroom compost, composted municipal wastes, sewage plant solids, and agricultural processing wastes.

The proportions of organic waste and fly ash which accomplish deodorization of the organic waste and produce the fertilizer compositions of the present invention range between about 20:1 and about 1:9 parts by weight of organic waste to fly ash. The preferred proportions are between about 3:1 and about 1:3 parts by weight, i.e., from about 75 to about 25 percent by weight of organic waste and from about 25 to about 75 percent of fly ash. Water content of the wastes is variable and may approach 97 percent water content for sewage sludge. Manures may run as high as 70 percent water. Therefore the range of mix ratios is wide.

Fresh organic waste is preferred for the uses of this invention, but partially decomposed wastes can be used. Fresh wastes are preferred, because partially putrified organic wastes, such as pig and cattle manure, have liberated ammonia under anaerobic digestion when mixed with fly ash and because the resulting fertilizer product is lower in nitrogen content than the fertilizer from fresh organic wastes.

Since the wastes vary widely in water content from about 15% to nearly 100% depending upon seasonal exposure, storage conditions, freshness and etc. the addition of water may be required in order to facilitate the handling and mixing of relatively drier organic wastes and fly ash. For facile handling of the mixture of organic waste and fly ash, a total water content of the organic waste-fly ash mixture should contain between about 10 and about 45 percent by weight water. The amount of water that may be added is dependent on the initial moisture content of the starting materials, as well as the handling characteristics required.

When it is necessary to increase the nitrogen content of the deodorized fertilizer composition, urea, dicyandiamide, ammonium nitrate, or the like may be added to the composition. Urea and ammonium nitrate are preferred additives, in amounts up to 40 percent by weight of the deodorized mixture of organic waste and fly ash. Solid urea or ammonium nitrate may be added to the fly ash before it is mixed with the organic waste. Alternatively, an aqueous solution of urea or ammonium nitrate may be added to the organic waste before it is combined with the fly ash.

If it is desirable to add more than nitrogen values to the deodorized organic fertilizer, it is convenient to use a nitrogen-phosphorus-potassium (N-P-K) additive, such as 5-10-5, 10-10-10, 0-16-8, 10-20-10, and the like. The N-P-K additive may be introduced as a solid or in an aqueous solution, up to a maximum of about 40 percent by weight of the total mixture of organic waste and fly ash.

Amounts ranging up to 5 percent of pesticides, plant growth regulators, and the like can be incorporated in the deodorized fertilizer compositions by the same techniques used for the N-P-K additives.

Although the mechanism by which fly ash acts to deodorize organic waste to produce a useful fertilizer composition is not entirely understood, it is thought that the fly ash a) acts as a pH buffer of the organic waste and b) produces chemical reactions between the oxides in the fly ash and aerobic and anaerobic decomposition products of the organic wastes thus minimizing or eliminating the formation of obnoxious gases.

The fly ash used in the present invention is obtained from combustion products of pulverized coal, usually by electrostatic precipitation. The particle size ranges from about 1 to about 50 microns. The fly ash compositions range widely. Typically, this material is made up of silica, alumina, iron oxide, calcium oxide, sulfur oxide and other trace materials. A representative analysis would be as follows (weight percent): 29–57% silica, 5–32% of alumina, 2–41% of ferric oxide, up to 14% of calcium oxide, up to 3% magnesium oxide, up to 8% of sulfur trioxide, up to 2% of sodium oxide, and up to 3% of trace metal oxides. Fly ash composition ranges preferred for the purposes of this invention are 34–48% of silica, 17–31% of alumina, 2–27% of ferric oxide, 1–10% of calcium oxide, 0.5–2% of magnesium oxide, and 0.4–8% of sulfur dioxide.

The organic wastes useful in the practice of the present invention, while generally recognized as potential sources of valuable nutrients for plants and the like, are not generally used because of the odor problem associated with such use. Present interest in environmental pollution abatement has caused considerable concern about the problem of disposing of odoriferous wastes. Thus, this invention serves at least two problems, (1) the disposal of fly ash, and (2) the disposal of odoriferous waste materials.

Organic wastes which are useful in this invention are animal manure, spent mushroom compost, municipal wastes, sewage plant solids, and agricultural processing wastes. These usable organic wastes normally contain from 15 to nearly 100 percent water.

Animal manures which present a particularly serious disposal problem because of their offensive putrefaction products include manure from cattle, hogs, sheep, horses, domestic pets, poultry, etc. Commercial animal growers are faced with the disposal of several tons of manure daily. The problem of disposing of the manure economically and in compliance with environmental regulations has up until the present invention not been satisfactorily solved.

Spent mushroom compost, a type of horse manure, as well as municipal wastes are also useful in the practice of this invention. Similarly, sewage sludge or dewatered sewage sludge cake can be used. Sewage sludge is a soft muddy material comprising about 90 percent of water and about 10 percent of sewage sediment. Prior methods of disposing of sewage sludge included removing the sludge from sedimentation tanks, adding lime and ferric chloride and then dewatering the sludge to about 70 percent of water. The dewatered sewage sludge cake is then disposed of by burning. The cost of this type operation runs upwards of $2.00 per ton, in addition to the cost of dewatering.

Agricultural processing wastes which can also be used in the present invention include wastes from meat packing plants, poultry packing plants, and plants processing fish and marine animals.

In order to prepare the compositions according to this invention, a suitable mixer or blender is required to thoroughly mix the organic waste with the fly ash. The mixing or blending is continued until the mix is homogeneous throughout the mass. The mix may be extruded or pelletized and, if necessary, dried in air or heated to a low temperature, e.g., about 100°F. to about 212°F. The homogeneous mix can be formed into any desired shape, e.g., a planting pot. Alternatively, the deodorized organic wastes may be applied as a powder to the surface being fertilized or reclaimed, e.g., coal mine culm banks and gob piles.

Having described the present invention in its broad aspects, examples are now presented to illustrate the invention. However, these examples are illustrative and not intended to be limiting:

EXAMPLE 1

A representative fly ash was obtained from the Homer City Generating Station of the Pennsylvania Electric and had a bulk density of 64.8 lbs./ft.$^3$ and an ignition loss of 2.19%. The material was analyzed and showed the following composition:

| Ingredient | % by Weight |
| --- | --- |
| Silica | 45.06 |
| Aluminum Oxide | 25.77 |
| Ferric Oxide | 19.60 |
| Calcium Oxide | 1.33 |
| Magnesium Oxide | 0.78 |
| Titanium Oxide | 1.09 |
| Sodium Oxide | 1.34 |
| Potassium Oxide | 2.52 |
| Sulfur Trioxide | 0.32 |
| Manganese Oxide (MnO) | 0 |

Fresh cattle manure was mixed with the aforesaid Homer City station fly ash in a 1:1 weight ratio. The mixture contained about 35 percent water.

For comparative purposes, fresh cattle manure was mixed with lime (calcium oxide) and limestone (calcium carbonate), respectively, in 1:1 weight ratio.

Each of the samples as prepared above was dried overnight under ambient conditions, placed in a closed container, and checked periodically for odor. The cattle manure-fly ash composition was judged qualitatively less offensive than the composition prepared with lime and limestone even after 30 days at which time the test was terminated.

EXAMPLE 2

Fresh hog manure, considered particularly more obnoxious than most other animal excrement, was treated with each of the Homer City Station fly ash of Example 1 and compared against samples treated with lime and limestone. Different ratios of manure to treating agent were used, i.e., 3:1, 1:1, and 1:3 by weight.

The thus prepared samples were evaluated as in Example 1. In all cases, the compositions containing fly ash was judged to be much less obnoxious than those containing either lime or limestone. A sealed sample of the hog manure-fly ash composition was also less odorous, in comparison to the lime or limestone treated samples. Also, there was no ammonia evolution from any of the hog manure-fly ash compositions after 21 days.

EXAMPLE 3

21 day-old hog manure was mixed in 3:1, 1:1, and 1:3 weight ratios with each of Homer City Station fly ash and compared against similarly prepared lime and limestone treated manure. The fly ash-hog manure samples evolved less ammonia than the lime and limestone-treated samples.

The unique characteristic of fly ash is to act as a binder to support and hold molded or otherwise shaped organic wastes is evident from the following examples:

EXAMPLE 4

35.8 pounds of composted municipal waste was blended with a mixture of 35.8 pounds fly ash and 28.4 pounds ammonium nitrate using a mixing screw. The mixture was pelletized in a commercially available pelletizer and air dried. The air-dried pellets had a N-P-K ratio of 10-0-0.

EXAMPLE 5

1 liter fresh cattle manure is blended with a mix of 1 liter fly ash and 50 grams urea. The resulting homogeneous mix is molded in a laboratory mold in the shape of flower pots and dried in a laboratory oven at 50°C. No appreciable odor is noted during the drying process.

The dried pots are used as planting pots, which slowly yield plant nutrients to the plants growing therein.

What is claimed:

1. A deodorized fertilizer composition consisting essentially of a hemogeneous mixture of animal manure organic waste and a fly ash binder present in an amount effective in deodorizing said organic waste, said fly ash having the following composition: 29–57% silica 5–32% of alumina, 2–41% of ferric oxide, up to 14% of calcium oxide, up to 3% magnesium oxide, up to 8% of sulfur trioxide, up to 2% of sodium oxide, and up to 3% of trace metal oxides, the weight ratio between said organic waste and said fly ash binder ranging from about 20:1 to about 1:9.

2. The deodorized fertilizer composition of claim 1 wherein the organic waste and the fly ash binder are in weight ratios ranging from about 3:1 to about 1:3 and the fly ash binder comprises between about 34 and about 48 percent by weight of silica, between about 17 and about 31 percent by weight of alumina, between about 2 and about 27 percent by weight of ferric oxide.

3. The deodorized fertilizer composition of claim 1 wherein the fly ash binder is in the form of particles ranging from about 1 to about 50 microns in diameter.

4. The deodorized fertilizer composition of claim 1 wherein said organic waste is an animal manure selected from the group consisting of cattle manure, hog manure, poultry manure, sheep manure, horse manure, domestic pet manure, and mixtures thereof.

5. The deodorized fertilizer composition of claim 1 wherein the homogeneous mixture of the organic waste and the fly ash binder contains about 10–40 percent by weight of water.

6. A method of deodorizing comprising the step of homogeneously mixing the organic waste with a binder consisting essentially of fly ash in a weight ratio between about 20:1 and about 1:9, said fly ash comprising 29–57% silica, 5–32% of alumina, 2–41% of ferric oxide, up to 14% of calcium oxide, up to 3% magnesium oxide, up to 8% of sulfur trioxide up to 2% of sodium oxide, and up to 3% of trace metal oxides.

7. The method of claim 6, wherein said organic waste and the fly ash binder are homogeneously mixed in weight ratios between about 3:1 and 1:3 and said fly ash binder comprises between about 34 and about 48 percent by weight of silica, between about 17 and about 31 percent by weight of alumina, between about 2 and about 27 percent by weight of ferric oxide, and drying said mixture.

8. The method of claim 6 wherein the fly ash binder consists of particles from about 1 to about 50 microns in diameter.

9. The method of claim 6 wherein said organic waste is an animal manure selected from the group consisting of cattle manure, hog manure, poultry manure, sheep manure, horse manure, domestic pet manure, and mixtures thereof.

10. A deodorized fertilizer composition consisting essentially of a homogeneous mixture of a) animal manure organic waste, b) a fly ash binder present in an amount effective in deodorizing said organic waste, said fly ash having the following composition: 29–57% silica 5–32% of alumina, 2–41% of ferric oxide, up to 14% of calcium oxide, up to 3% magnesium oxide, up to 8% of sulfur trioxide, up to 2% of sodium oxide, and up to 3% of trace metal oxides, the weight ratio between said organic waste and said fly ash binder ranging from about 20:1 to about 1:9, and c) an effective amount up to about 40 percent by weight of an additive to increase the nitrogen content of said mixture, said additive being selected from the group consisting of urea, ammonium nitrate, and nitrogen-phosphorus-potassium fertilizer.

* * * * *